United States Patent
Curtis (10) Patent No.: US 7,032,220 B2
(45) Date of Patent: Apr. 18, 2006

(54) METHOD AND APPARATUS FOR SAVING INSTALL PROPERTIES IN A FILESET OBJECT AND/OR SYSTEM REGISTRY FOR USE DURING UNINSTALL

(75) Inventor: Bryce Allen Curtis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 10/076,334

(22) Filed: Feb. 14, 2002

(65) Prior Publication Data

US 2003/0159138 A1  Aug. 21, 2003

(51) Int. Cl.
*G06F 9/445* (2006.01)

(52) U.S. Cl. ..................................... 717/174
(58) Field of Classification Search ............... 717/121, 717/168–178
See application file for complete search history.

(56) References Cited

U.S. PATENT DOCUMENTS

| | | | | |
|---|---|---|---|---|
| 5,715,463 A | | 2/1998 | Merkin | 395/712 |
| 5,966,540 A | | 10/1999 | Lister et al. | 395/712 |
| 6,006,035 A | | 12/1999 | Nabahi | 395/712 |
| 6,269,480 B1 | | 7/2001 | Curtis | 717/11 |
| 6,272,677 B1 | | 8/2001 | Lam et al. | 717/11 |
| 6,301,708 B1 | * | 10/2001 | Gazdik et al. | 717/175 |
| 6,347,397 B1 | * | 2/2002 | Curtis | 717/170 |
| 6,363,499 B1 | * | 3/2002 | Delo et al. | 714/15 |
| 6,446,255 B1 | * | 9/2002 | Curtis et al. | 717/121 |
| 6,631,521 B1 | * | 10/2003 | Curtis | 717/175 |
| 6,662,340 B1 | * | 12/2003 | Rawat et al. | 715/507 |
| 6,735,766 B1 | * | 5/2004 | Chamberlain et al. | 717/173 |
| 2002/0065901 A1 | * | 5/2002 | Goodwin et al. | 709/218 |
| 2003/0051235 A1 | * | 3/2003 | Simpson | 717/174 |

OTHER PUBLICATIONS

Cassady-Dorion, et al. Industrial Strength Java, 1997, New Riders Publishing.*

"Method to Provide Password Security Without Storing Password", Aug. 1, 1987, IBM Technical Disclosure Bulletin, vol. 30, Issue 3, p. No. 1068.*

* cited by examiner

Primary Examiner—Kakali Chaki
Assistant Examiner—Trenton Roche
(74) Attorney, Agent, or Firm—Duke W. Yee; Jeffrey S. LaBaw; Cathrine K. Kinslow (57) ABSTRACT

An apparatus and method that allows developers to create installation programs in which variables and variable values used during a product installation are automatically stored in a system product registry and/or a fileset object. During installation of a product, variables and variable values may be stored in a hashtable. The hashtable is saved as part of a fileset object. When the fileset is reinstated at uninstall time, the installation information is contained within the reinstated fileset. Objects used by the uninstall program can make use of this information to affect the uninstall behavior. Alternatively, the variable and variable values may be stored in a hashtable that is saved to the system product registry at the end of the installation process so other programs and tools may have access to the information. This allows other installation programs to query the registry for information used in the installation of other products.

24 Claims, 5 Drawing Sheets

FIG. 1

FIG. 3 state: Build File Set — 1301    1303

1302 — Program prog=new Program (————)

1304   1305   1306   data.zip
1310 — F.6set fs=Prog.add FileSet (logfile,-,-,-,-)

1308 — fs.SetUninstall (true) — 1309

1312 — fs.SetVendor...

1314 — Install Object io=new Install Object ()

1316 — fs.add Object (io)

1318 — state: checkDep

1320 — vector v=fs.checkDependencies();
                                    \
1322 — Copy:          1319 fs.add Files ("*.html",c:\MyDir\html,subdirectories,"711","owner");
              /        /         /            \        \        \
            1324     1326      1328         1330     1332     1334

1340 — prog.checkdskspace();

1342 — prog.install();

METHOD AND APPARATUS FOR SAVING INSTALL PROPERTIES IN A FILESET OBJECT AND/OR SYSTEM REGISTRY FOR USE DURING UNINSTALL

RELATED APPLICATIONS

Application Ser. No. 09/280,345, entitled "A Cross-Platform Program, System, and Method Having a Global Registry Object for Mapping Registry Equivalent Functions in an AIX Operating System Environment"; application Ser. No. 09/280,350, entitled "A Cross-Platform Program, System, and Method Having a Global Registry Object for Mapping Registry Equivalent Functions in an OS/2 Operating System Environment"; application Ser. No. 09/280, 349, entitled "A Cross-Platform Program, System, and Method Having a Global Registry Object for Mapping Registry Functions in a Windows Operating System Environment"; application Ser. No. 09/280,371, entitled "Global Registry Object for Mapping Registry Functions and Registry Equivalent Functions Across Multiple Operating Systems in a Cross-Platform Program"; application Ser. No. 09/280,368, entitled "A Cross-Platform Program, System, and Method Having a System Independent Registry for Use on Operating Systems Irrespective of a Registry Equivalent"; application Ser. No. 09/280,344, entitled "A System, Method, and Program for Enabling a Use of Property Object Having a Variable for a Property Value in a Cross-Platform Program"; application Ser. No. 09/280,346, entitled "A System, Method, and program for Overriding Program Properties"; application Ser. No. 09/280,375, entitled "A System, Method, and Program for Automatic Error Detection While Utilizing a Software State Machine for Carrying Out the Process Flow of a Software Program"; application Ser. No. 09/280,376, entitled "A System, Method, and Program for Utilizing a Software State Machine for Carrying Out the Process Flow of a Software Program"; application Ser. No. 09/280,369, entitled "A System, Method, and Program for Enabling a Software Program to Automatically Select a System-Dependent Function"; application Ser. No. 09/280, 372, entitled "A System, Method, and Program for Mapping a Global Object to Desktop Elements of Different Operating Systems"; application Ser. No. 09/280,370, entitled "A System, Method, and Program for Processing Dependencies Using a Dependency Object"; application Ser. No. 09/280, 348, entitled "A System, Method, and program for Modifying a Text File"; application Ser. No. 09/280,351, entitled "A System, Method, and Program for Updating Registry Objects with a Cross-Platform Installation Program"; application Ser. No. 09/280,374, entitled "A System, Method, and Program for Preserving Background Settings During Install and Uninstall Operations"; application Ser. No. 09/280,347, entitled "A System, Method, and Program for Modifying a Library Object"; application Ser. No. 09/280,353, entitled "A System, Method, and Program for Installation on Drives Using a Drive Object"; and application Ser. No. 09/280,373, entitled "A System, Method, and Program for Performing Program Specific Operations During the Uninstallation of a Computer Program from a Computer System".

The above are all filed on Mar. 29, 1999, and are assigned to the assignee of the Present application, and incorporated by reference herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field

This invention relates to install programs, and more specifically to an install program having a containment structure wherein each fileset contains at least one install object having all install properties saved therein such that they may be used when performing an uninstall operation.

2. Description of Related Art

An installer program is a software program that enables a programmer to write specific code that will allow a user to install a given application program onto the drives of a computer in a way that enables the given application program to work correctly with the computer's environment including its operating system. There are several types of installers —Java installers and operating system specific installers, e.g.., Windows installers, OS/2 installers and AIX installers, etc.. Many of these install programs existing today have various limitations in their functionality as discussed below.

One type of Java installer is provided by a software company known as InstallShield. Currently, this Java installer has some limitations on certain functional features. For example, the Java installer provides default panels, but the text can't be changed or configured. Also, this Java installer is not easy to customize. In other words, a programmer cannot easily add a function to the installer program that it doesn't already do. In addition, the Java installer does not provide very much registry support. A registry is a central repository for all possible information for the computer such as hardware configurations and software settings, etc. The registry enables a user/programmer to keep information about the software product. It enables a user to find out information about other products, based upon what the user/programmer put into the registry or what the user is looking for. Presently, the Java installer only works with a Windows' registry; and the support provided here is limited. For example, it does not enable the system Windows' registry to be updated directly. Instead, the keys to be updated are in a file which must be imported into the registry through a system call. It would be desirable if such a Java installer program supported multiple directories, splash screens (which are images that come up while a software product is being installed), and multiple languages instead of just English. Furthermore, it would be desirable for a given installer program to be more broadly applicable to other environments and operating systems. Although InstallShields' Java installer is tailored to Java, it is also geared somewhat for the Windows' operating system as discussed above in terms of the Windows' registry support provided. However, it does not provide specific support for other operating systems such as OS/2 or AIX.

Another Java installer is called "Install Anywhere" from ZeroG. This Java installer program also has a default panel that cannot be changed, i.e., it is not customizable in terms of the order in which the panels are to appear. Likewise, registry support is limited. A user/programmer updates a registry from a file using a "reg_edit" command. Although this installer program enables a user/programmer to add a few items into the registry, the registry cannot be queried. In addition, other registry functional features are not available. Likewise, there is no multiple directory support, and no national language support. Also, it does not support multiple operating systems, i.e., there is no OS/2 or AIX specific support.

Another approach would be to provide install APIs for Java. However, this approach is not yet available.

With respect to operating system specific installers, InstallShield provides a Windows' 32 installer. Although this installer program is widely used throughout the industry, it is based upon a proprietary scripting language that InstallShield defined. The scripting language is similar to Basic programming language. Nevertheless, a user/programmer must learn the scripting language to be able to write an install program, and it is not a real easy language to write in. When creating install programs using the Windows' 32 installer, a programmer must first learn the new language. Even then, it is difficult to write complicated install scripts with this scripting language.

For the OS/2 operating system, there is not a true architected way within the operating system itself to install. Two programs have existed for writing install code on OS/2. One of them is "Feature Installer", which has a tendency to be difficult to use. Also, it is hard to figure out how to write an install program from it. For example, it is tied into the workplace shell which requires special knowledge of SOM programming. Also, there is no compression of files. The second program is "Software Installer", which was the precursor to "Feature Installer", and is no longer supported as a product.

Also, for the OS/2 operating system, since OS/2 has Java on it, a programmer could use InstallShields' Java edition to write install code to install some types of programs. However, this does not provide much function other than just copying files.

Other than using Feature Installer, Software Installer, or a Java Installer, programmers must come up with their own way to write install code for an application program on an OS/2 machine.

Since the OS/2 operating system appears to have been architected without regard to install features, the above discussed ways for installing OS/2 application programs have no way to talk to each other. They will each have a different way of keeping track of things. As such, there is no one place to go to find out what has been installed on an OS/2 machine or to check dependencies to see what has been installed already.

For the AIX operating system, the command "installp" is used to install products. It is platform specific. It is also command line driven which is typical for the AIX operating system. Nevertheless, it appears to work well and is widely used.

As shown above, installers are tailored for a specific operating environment, e.g.., JAVA, and/or operating system. As such, programmers using an installer to write install code must know and understand the specific operating environment and/or system quite well. This creates an added burden for a software company that produces many different application programs, with each application program available on many different operating systems. Separate install code must be written for each application for each different operating system. This requires a matrix of expertise—expertise in a given application, and expertise in a given operating system environment. This requires either a widely knowledgeable expert who is burdened with writing various specific versions of install code, or many different expert programmers who are essentially assigned the same task of writing install code.

Without such expertise, small software products just do not get install programs written for them for various platforms. In addition, money, resources, and time could be saved by writing an installer program only once that is applicable across all operating systems and environments.

In addition to the above, installer programs typically do not store variables or variable values during the installation of the program for later use during uninstall. Rather, the installation programs only store filenames and paths of the items actually installed so that these files may removed during the uninstall process. Because these variables and values are not stored, developers of uninstall programs are limited in the customization they may provide for the uninstall operations. Furthermore, other applications, during their respective installation on a computing system, may not obtain information about the programs already installed on the computing system and their installation variables. Thus, it would be beneficial to have an apparatus and method for storing installation variables and variable values such that other installations of applications and uninstall applications may obtain access to the variables and variable values for use in customizing the installation and removal of programs on a computing system.

SUMMARY OF THE INVENTION

The present invention provides an installation tool kit apparatus and method that allows developers to create installation programs in which all of the variables and variable values used during a product installation are automatically stored in one or more of a system product registry or database and a fileset object.

With one particular embodiment of the present invention, during installation of a product, the variables and variable values are stored in a hashtable. The hashtable is saved as part of a serialization of a fileset object. Thus, when the fileset is reinstantiated at uninstall time, all of the installation information is contained within the reinstantiated fileset. The fileset object and other objects used by the uninstall program can make use of this information to affect the uninstall behavior.

In another embodiment of the present invention, the variable and variable values are stored in a hashtable that is saved to the system product registry at the end of the installation process. Since this information is stored in the system product registry, other programs and tools may have access to the information. This allows other installation programs to query the registry for the required information and use this information in the installation of other products.

Since some variables and variable values may contain sensitive information, such as passwords for example, the present invention provides a mechanism by which sensitive variables and variable values may be filtered out during the automatic storing of installation variables. In this way, sensitive information is not stored in locations where this information may be accessed by unauthorized programs and tools.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The following description and the accompanying drawings illustrate a preferred embodiment of the present invention. It is understood that other embodiments may be utilized, and structural and operational changes may be made, without departing from the scope and spirit of the present invention.

Figure 1:
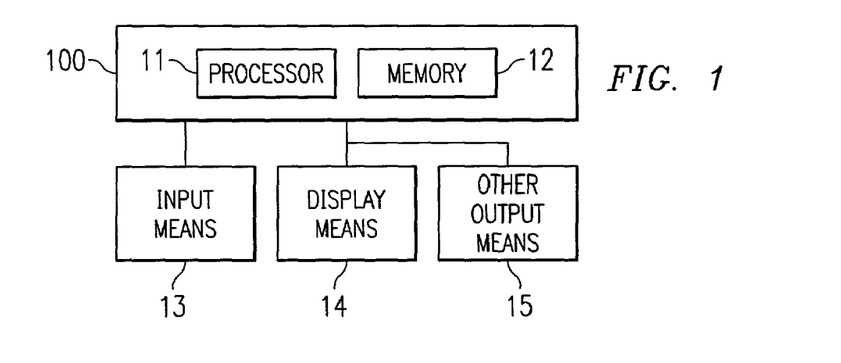
FIG. 1 depicts a block diagram of a data processing system in which a preferred embodiment of the present invention may be implemented.

With reference to FIG. 1, a block diagram of a data processing system 10, i.e., computer system, in which a preferred embodiment of the present invention may be implemented is depicted. The computer includes a processor 11 and memory 12. The computer 10 may be, but is not limited to, a personal computer, workstation, or a mainframe. The computer system also includes input means 13 such as a keyboard and/or mouse and/or track ball and/or light pen and/or pen-stylus and/or voice-sensitive device and/or touch-sensitive device, and/or other pointing devices and/or other input means. Also included are display means 14 such as a display monitor and other output means 15 such as printers, etc.

Memory 12 includes volatile or nonvolatile storage and/or any combination thereof. Volatile memory may be any suitable volatile memory device known in the art, e.g., RAM, DRAM, SRAM, etc.. Nonvolatile memory may include storage space, e.g., via the use of hard disk drives, for programs, whether or not the programs are being executed. The programs in memory 12 include an operating system program and application programs, such as an install program or an installer tool kit. If the memory 12 is comprised of volatile and nonvolatile memory devices, then data and programs may be swapped between the volatile and nonvolatile devices in a manner known in the art.

The exemplary embodiment shown in FIG. 1 is provided solely for the purposes of explaining the invention and those skilled in the art will recognize that numerous variations are possible, both in form and function. For instance, any one or more of the following—the processor and/or memory and/or the input/output devices—could be resident on separate systems such as in a network environment. Any such variation to FIG. 1 is within the sprit and scope of the present invention.

The computer system and parts thereof depicted in the figures and described below, and the Java implementations described herein, are provided solely as examples for the purposes of explanation are not intended to necessarily imply architectural limitations. Those skilled in the art will recognize the numerous programming languages which may be utilized, all of which are believed to be embraced within the spirit and scope of the invention.

Figure 2:
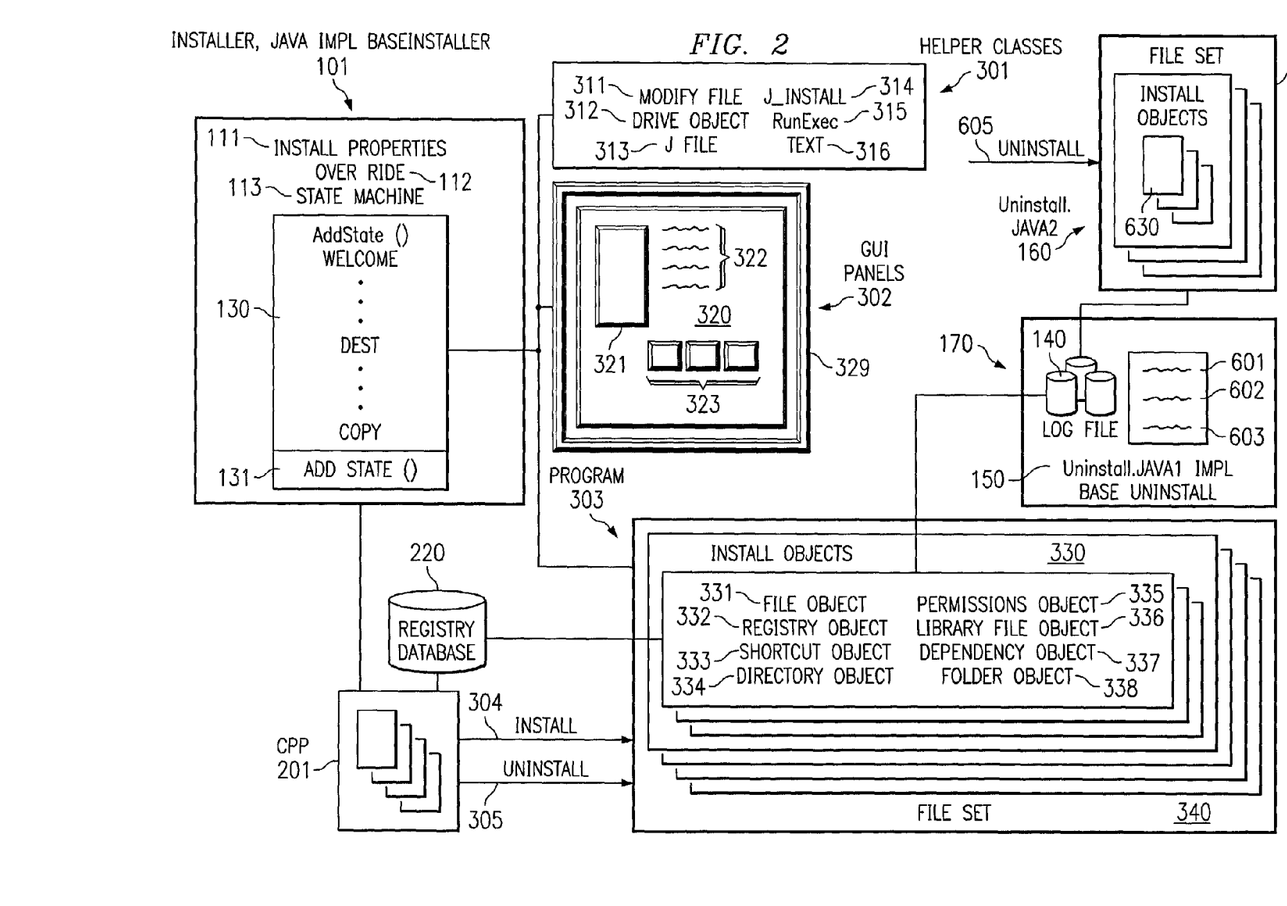
FIG. 2 depicts the flow and structural components of a cross-platform installer program.

The system, method and program of a preferred embodiment of this invention enables the creation of a cross-platform installer program in accordance with the structural components and flow of FIG. 2.

A script, referred to herein as "Installer.java", 101 in FIG. 2, is used to run the install engine. The script implements the base installer class in Java. Within the script 101 there are the following entities: a) install properties 111; b) an override function 112; c) and a state machine 113. Within the state machine 113, there are various states 130 such as a welcome state, a destination state, a copy state, etc. This state machine includes an "add state method" 131 which is further used to check for errors. The following process takes place when the base installer class starts running: a) the properties are set up, 111, b) the properties are overridden, 112, and then c) the state machine 113 is executed. The program stays in the state machine 113 until exited out. At exit, the program has either been successfully or unsuccessfully installed.

Within any given state 130 there are several objects. There are helper classes 301, GUI panels 302, and a program object 303.

Within the helper classes 301, there is a modify file class 311, a drive object class 312, a J file class 313, a J install class 314, a run exec class 315, and a text class 316. The modify file class 311 and drive object 312 will be discussed in more detail either below or in a related application. J file 313 is a class that enables actions to be performed with files and directories. J install 314 contains methods that enables access to environment variables and enables other similar activities. Run exec 315 is a class that enables the running of operating system calls. Text class 316 is a class that is used to handle national language support.

An example of a GUI panel 320 is shown in FIG. 2. There may be an image 321, text or controls 322 and buttons 323 such as back, next or cancel. The GUI panels 320 all extend a class calling a wizard dialog. They are displayed in a mainframe class 329. The mainframe class manages the screen display, e.g., gradient background color, text. It also manages the splash screens and titles and other similar items including where they are being displayed. In other words, it manages the background image and screen image upon which the dialogs are displayed.

Within any given state there is also the heart of the install program, which is a program object 303 having fileset objects 340. Within each fileset object 340 there are multiple install objects 330. There are several types of install objects—file object 331, registry object 332, shortcut object 333, directory object 334, permissions object 335, a library file object 336, a dependency object 337, and folder object 338. Other objects are also possible. All of these objects extend or implement install objects 330. In addition, all of the install objects have certain methods on each of them. In particular, each install object knows how to install or uninstall itself, how to log itself, and how to internalize from a log, i.e., how to build itself back up again from reading from a log.

The install process that the script 101 enables includes running the state machine 113 through various states 130 which cause different events to take place. For example, a GUI panel may pop up as part of the welcome state. During a destination state, another GUI panel may pop up on the screen that asks where the product is to be installed. The install properties 111 may be used in the destination state by having a destination panel set a particular destination directory name of an install property to a particular directory. During the copy state, the program object 303 is built up with all of the install objects 330 in them. The install command 304 is then called on the program object. Each one of the filesets 340 and install objects 330 contains an install method. As such, by calling install 304 on the parent object, i.e., the program object 303, the program object goes through and calls install on all of the other objects 340, 330 that it contains.

Likewise, the uninstall process is also enabled by the script 160. For uninstall, there is an uninstall method on the fileset 340 and on all of the other install objects 330. By calling uninstall 305 on the program 303, everything becomes uninstalled, i.e., the program, filesets and install objects.

It should be noted that during an install, each one of the install objects 330 gets written out to a log file 140 which is put into a particular directory. At the same time that the install objects 330 log themselves to the log file, there is also another file, called "uninstall.Javal" 150 which implements a "base uninstall" class. It has several methods in it that get called at different points during uninstall. During install, the log 140 and "uninstall.Javal" 150 information are built. The log file 140 and "uninstall.Javal" 150 are in the file system 170 on a particular directory. If it is uninstalled, the first thing that happens is that it reads into "uninstall.Java2" 160 the log files 140 and recreates the same structure 160 as the filesets 340 and install objects 330. It does not recreate the program object 303, but rather it recreates the structure of everything contained within the program object, i.e., filesets 640 and install objects 630. As a result, recreated from the log file 140 is a fileset with all of the install objects that it contains. There is one log file for each fileset. Directory 170 can be thought of as a container just like the program directory 303 is a container for the fileset 340 and install objects 330.

"Uninstall.java2" 160 builds up the filesets 640. Uninstall 605 is called by the uninstaller, and it goes through each fileset and install object and uninstalls itself. During the uninstall of each fileset 640, the base uninstaller class 150 is called at the beginning and at the end of the fileset. Therefore, at the beginning and ending of copying a fileset 640, the installer makes a call to the base uninstaller class 150 at appropriate points 601, 602, 603, as discussed below. This allows certain things to happen when the fileset is being uninstalled.

There are certain platform specific operations that are taking place throughout the different objects, i.e., the helper classes 301, install objects 330, etc. Therefore, there is a platform specific module/interface, referred to herein as CPP 201. CPP 201 defines a set of methods, that are representative of different operating systems, for functions that need to take place for an install. There are several different CPPs 211, 212, 213, ... 219, etc., one for each operating system. For example, CPP Win 32, CPP OS/2, CPP Solaris, CPP Linux, and CPP AIX. There is also a CPP default. If the operating system is not implemented through a CPP, the CPP default is used. This CPP 201 is the platform specific code for the installer.

Since most platforms, i.e., operating systems, do not have a registry, a platform independent registry database class 220 is created which ties the platform specific code 201 with registry objects 332. The registry database 220 implements the registry function for those platforms which do not have a registry.

The above description presented an overview of the install program and how it works. The following describes, in more detail, various parts of the overall structure and process described above.

More specifically, the following describes an object oriented install architecture which includes the program object 303 and log file 140. Within one or more of the states 130, a program object 303, various fileset objects 340, and install objects 330 are defined and built up. First, a program object 303 is created. Then, fileset objects 340 are added to the program object 303; and different install objects 330 are added to each fileset object 340. Once the program object 303, fileset objects 340 and install objects 330 are completely built up, the call "install" 304 on the program 303, will call "install" on the fileset object 340 and all of the install objects 330. Then, the fileset object 340 creates a log 140. Each of the install objects 330 then logs to the particular log file 140 of the fileset object. When a fileset is done being installed, the log for that fileset is closed. The process continues with the next fileset. The next fileset creates a new logfile and the process repeats.

During uninstall 305, the logfile 140 for each fileset 340 is used to recreate the fileset 640 and the install objects 630. Uninstall 605 is then called on it, and it uninstalls all of the install objects that were installed. Then at different points within a fileset 640, such as at begin and end, "uninstall" 605 calls two different methods 601, 602 in the uninstall Java class 150 that is specific to this program.

Figure 3:
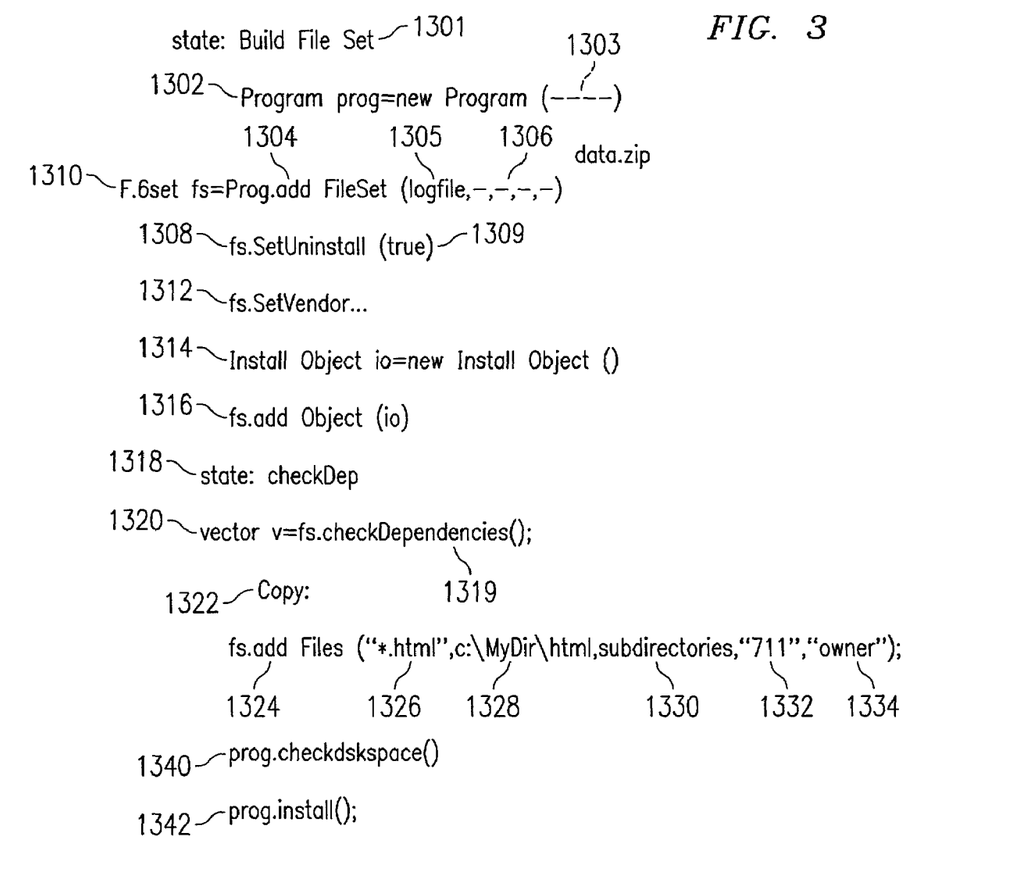
FIG. 3 illustrates various states for building a program containing filesets and objects, checking dependencies, and checking disk space as a prerequisite to installing or uninstalling filesets and object.

Within the state machine 130, a preferred embodiment of the invention has a state called "build fileset" 1301. Within this "build fileset" state, one of the first steps creates a program object 1302. The program object contains several parameters 1303 such as program name, program version, and where the directory is, that is, the directory where all of the log files will go into. Once the program object is created, filesets are added to it, 1304. The code which adds filesets returns a fileset object, 1310. A fileset object contains the log file name 1305. The directory was specified by the program object, and the log file name itself is specified by the fileset object. In addition to the log file name, the fileset object contains the fileset name, fileset version, the location of the source files such as in a zip file or in a directory structure, 1306. The fileset object also contains a variable true or false for identifying whether or not items are backed up when the install is taking place over the top of an existing program. In this way, if the latest version of the program is being uninstalled, the previous version that was previously installed underneath is now on top and available.

For each fileset, there is a method call "SetUninstall" 1308 which allows a user to selectively uninstall a fileset; i.e., a part of the program. For example, there may be several pieces or segments to the program such as documentation, base program files, a tutorial, etc. If the base is uninstalled, then everything gets uninstalled. However, if it is desired that only the tutorial be uninstalled, then the "SetUninstall" method for the tutorial fileset can be set to true 1309. This allows only the tutorial fileset to be uninstalled without uninstalling the entire program.

In other preferred embodiments, other items can be added to the fileset such as vendor information name, URL, etc. 1312.

A user/programmer can new up any one of these install objects 1314, and add it to the fileset to install it 1316. For example, to install a program, the process would new up a file object and add it to the fileset which would represent a group of files to be installed.

As shown, a new program object was created, 1302, and multiple filesets can be added to it just by repeating statement 1310. Further statements, such as 1308, 1312, 1316, do whatever a programmer wants to do to that fileset.

There are many different install objects that can be added to a fileset of e.g., dependency objects, registry objects, etc. To add a dependency object, a new state called "CheckDep", i.e., check dependencies could be created 1318. Within that state, a "fileset.checkDependencies" method 1319 would return a vector 1320 of all of the dependencies that are not yet installed. Dependencies are added to a fileset in the area of the program such as statements 1308, 1312. Then, with the one method call 1319 in the fileset, the program knows how to go through and check to see if everything that it requires to run is already installed. If everything it needs is not installed, then several tasks are undertakes as discussed separately below. If all of the dependencies are met, then the program enters a copy state.

It should be noted that in other embodiments, the states do not necessarily have to be unique, i.e., various functions can be combined into a single state, etc. However, for greater ease and flexibility, unique states having a fine granularity were defined in a preferred embodiment.

The copy state 1322 is described as follows. There is a method on a fileset called "addFiles( )" 1324. this is a shortcut way of newing up a file object, i.e., getting a file object, and adding it as in method "addObject(io)" 1316. For example, a programmer may desire to add all of the programmer's html files 1326 that were in the source to some directory called C:myDir/html, 1328. In doing this, the programmer has some options. The programmer may copy all sub directories 1330; and when they are copied, the programmer may want to have a set of permissions 1332 and some owner or group of owners 1334. This is the same type of information that is in the file object 1306. However, there are some helper methods in the fileset class that enables a programmer to do this in one line rather than newing up a file object and then adding it.

More specifically, the addfiles ( ) method 1324 instructs the install engine to look into the directory "myDir" which was specified in one of the parameters 1306 in adding a fileset object such as a parameter called data.zip. The install engine looks in the data.zip file, parses through it, and anything that matches the key 1326 or file name *. HTML is copied into the specified directory 1328, c:\myDir\html. As such a shortcut is set up. Other shortcuts can also be set up to perform other functions.

Checking disk space can also be performed 1340. Because the program knows all of the filesets that it contains, the program asks each fileset how much space it needs and performs a check to verify that there is enough disk space. If it is determined that there is enough disk space, a program install is performed 1342. "Prog.install" goes through all of the filesets that have been added to it 1310, 1308, 1312, through the "add fileset ( )" method 1304, and performs an install based on that. To complete this process, the install creates the logfiles in the directory.

Figure 4:
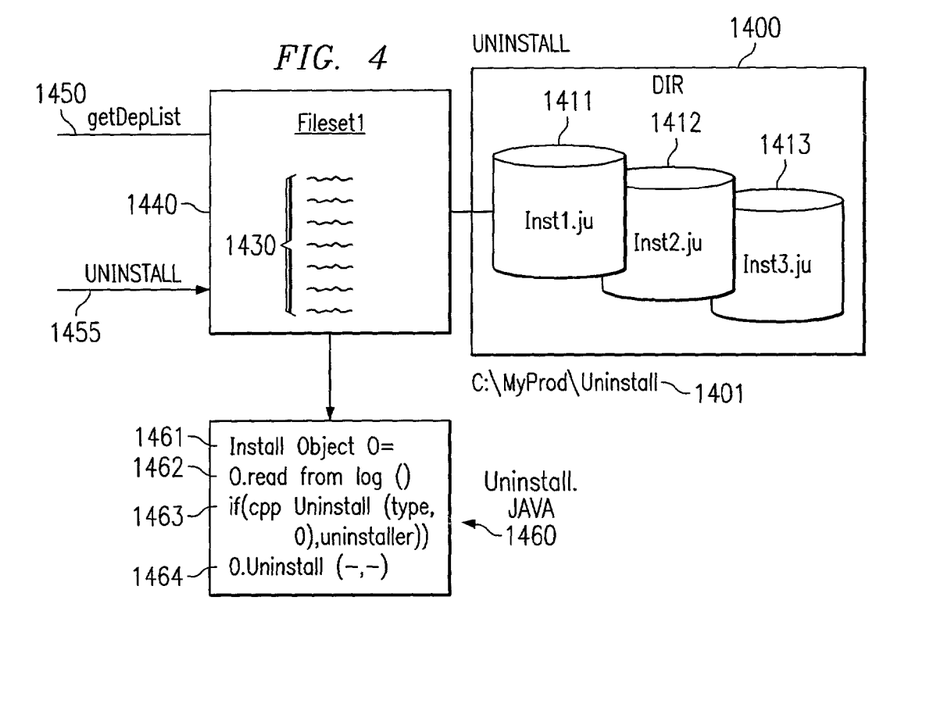
FIG. 4 illustrates an uninstall process.

For uninstall, reference is made to FIG. 4. A directory 1400, having a path name "c:\myprod\uninstall" may have several files shown as inst1.ju 1411, inst 2.ju 1412 and inst3.ju 1413 which represent three different filesets that make up the program "MyProd". The directory name "C:\myprod\uninstall" is passed to "uninstall". The uninstall process goes to the directory, and looks for all of the files that end in a designation representing a file to be uninstalled such as ".ju". Each such file is read in, and a new fileset 1440 is created for each one. As each file 1411-1413 is further read, there are install objects that are listed within each fileset. New install objects 1430 are then created. Once this is completed, what exists are filesets 1440 and install objects 1430 that are the same 340, 330 (FIG. 2) that were created during install. There is the same fileset, it is set up in the same way, with the same install objects, and they have the same methods on them. As such, there is a method on the fileset 1440 called "get dependency list" 1450 which checks to see if any of the programs that have been installed depend upon this fileset 1440.

If there are programs that have been installed that depend upon a fileset 1440 that has been created during the uninstall process, then such a fileset should not be uninstalled. A message appears to the user during the uninstall process that warns against deleting the fileset because such a deletion could cause a program currently installed on the system to malfunction.

However, if no such dependencies exist for that fileset, then the uninstall method 1455 can be called on the fileset. The uninstall method goes through and calls uninstall on each install object within the fileset. Each install object removes itself. Then the fileset cleans itself up when it is removed by deleting its logfile 1411. When the logfile is gone, the uninstall process repeats by going to the next fileset and doing the same uninstall process.

As part of the flow of uninstall in the uninstall class file, e.g., uninstall. Java 1460, a new instance of an install object is created which is based upon what has been read in from the log of the log stream 1462. A "CPP uninstall" method 1463 is performed. The type of the object, the object, and the uninstaller that is being used is passed to the "CPP uninstall" method. Most importantly, the object itself is being passed. This enables the platform specific module 201 (FIG. 1) an opportunity to see what it is that is being uninstalled, and to override it or cancel it out. If the return "CPP Uninstall" 1463 is true, then that indicates that the platform specific module has handled the process of uninstalling the object and that the main uninstall process should not continue with uninstalling that particular install object.

As such, before the uninstaller calls the uninstall method 1455 for each install object 1430, the uninstaller goes over to check with the platform specific code, CPP, 201 in FIG. 2, and passes in the object that it is getting ready to uninstall. The CPP module has an opportunity to override the uninstall process by returning a result that indicates that the install object should not be uninstalled by the uninstall method. Statement 1463, FIG. 4, returns true if the CPP module handled the install object and the install object should not be handled by the uninstall method, i.e., the install object should not be uninstalled. If a not or false is returned, then the uninstall method will go ahead and uninstall the object since the platform specific module did not handle it. "O.uninstall" will call the uninstall method on these install objects. The install objects will then uninstall themselves.

Events similar to these also happen during the install process. For example, for each install object, a platform specific "install" method is called, "CPP.install" that passes the same or similar information as for the CPP uninstall method 1463 such as the type of object, the install object itself, and the installer.

The platform specific install code looks at that install object, and has an opportunity to do something with the install object. Again, either a true or false is returned to indicate whether the platform specific code handled the install object and the install method 304 (FIG. 2) should not install the install object or whether the platform specific code did not handle it, or do anything with it, and therefore the install method 304 can go ahead and install it.

The above described technique is useful and needed when one tries to simulate an install on a platform specific operating system's install mechanism. For example, for the AIX operating system, all of the programs that are to be installed have to be first collected so that they can be added to a database. The database has to be updated with all the programs or all the files that were copied onto the system so that they can be considered to be installed correctly. This feature is useful for install and uninstall.

As mentioned above, the present invention provides an installer application and toolkit apparatus and method for installing programs in a manner that all variables and variable values used during the installation process are stored for later use by other applications or by an uninstall application. In this way, other applications may gather information about the installation of programs already present on a computing system and uninstall applications may obtain information about the installation variable values used to install a particular program being uninstalled.

Typically, installation programs store only the filenames, paths and version numbers of programs being installed. This information is then used by the uninstall application to remove the files having the designated filenames and version numbers located at the identified path. Known installation programs do not store any of the variables or variable values, such as user identifiers, and other user defined or installation program generated variables that are used during the installation process but do not directly represent items that need to be uninstalled. As a result, much of the information regarding the settings and manner by programs are installed is lost after installation.

With the present invention, however, all variables and variable values are stored for later use by uninstall programs and/or other applications. In this way, the variables and variable values may be used to determine the exact settings established during installation of a program so that other applications may install properly and the uninstall program may uninstall the application appropriately.

Moreover, by storing all installation variables and variable values during installation, developers need not be limited by the amount of information selected for storage by an installation program developer. For example, if an installation program developer decided that only the filename and path were to be stored in a fileset by the installation program, a developer of an uninstall program is limited to offering the features associated with the filename and path in the uninstall program.

By storing all of the installation variables and variable values, the developer of an uninstall program is free to customize the uninstall program in any manner he/she deems fit. Since all of the variables and variable values are available, the developer of the uninstall program need not be concerned about what information is available to the uninstall program. Thus, development of uninstall programs is made less work intensive. In addition, by storing all installation variables and variable values in a system product registry, other installation programs may retrieve information about already installed programs in order to further customize the installation of later programs.

Figure 5:
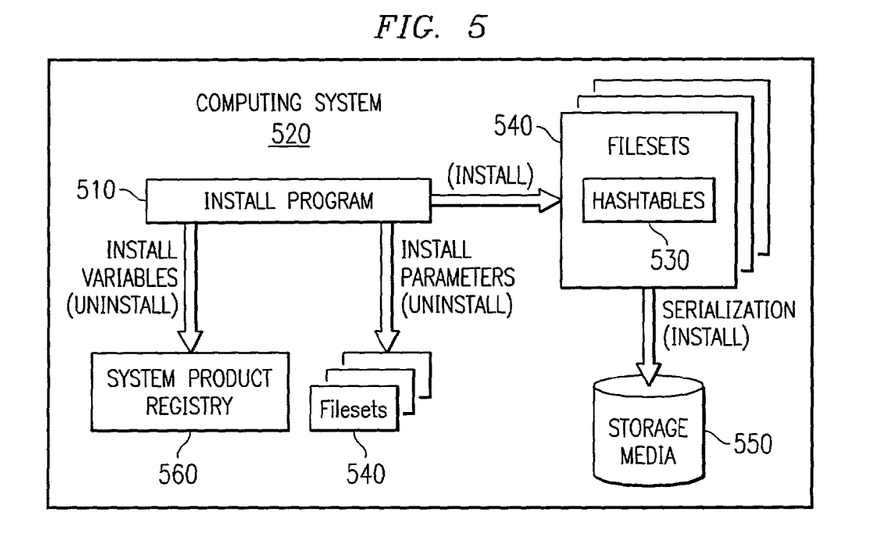
FIG. 5 is a diagram illustrating the storing of variables and variable values during an install process.

FIG. 5 is an exemplary block diagram illustrating one exemplary embodiment of the present invention. As shown in FIG. 5, the present invention includes an installation program 510 that is used to install an application on a computing system 520. During install, variables and variable values, hereafter referred to as installation properties, are identified and stored in hashtables 530 of filesets 540 for the application being installed. Installation properties are any variables and variable values input by the user during installation or generated by the installation program during installation of the application. Thus, any user selections from menus, typed-in information supplied by the user, variables and variable values automatically generated by the installation program, and the like, are included as installation properties that may be stored in hashtables 530 of filesets 540 for later use by uninstall programs.

Once the installation is completed, the filesets 540 are serialized, and thus the hashtables 530 in the filesets 540 are serialized, and stored to a storage media 550. In this way, the installation properties are stored in the serialized fileset for use by an uninstall program. Thus, the uninstall program will have access to all of the installation properties when the fileset is reinstantiated from the serialized fileset.

When the uninstall program is run on the installed application, the uninstall program reinstantiates the filesets from the serialized filesets stored on the storage media 550. In reinstantiating the filesets, what is meant is that the uninstall program generates filesets and initializes the parameters of the filesets to those identified in the serialized filesets read from the storage media 550. In addition, the uninstall program may read the installation properties from the serialized filesets and store these installation properties to the system registry 560 for the application. In this way, information regarding the particular selections and entries made by the user during installation, and the variables and variable values generated by the installation program during install is made available to other programs. This information may be used to further customize the uninstall program.

For example, consider an installation program that needs to stop a service running on Microsoft Windows 2000™, install some files, and then restart the service, The installation program must look at the system and determine how to stop and start the service. If this knowledge is saved, then the uninstall program does not need to rediscover how to stop and start the service in order to uninstall the application. Rather, with the present invention, the uninstall program may retrieve the commands needed from the installation variables to stop the service, uninstall the required files, and then restart the service again.

Figure 6:
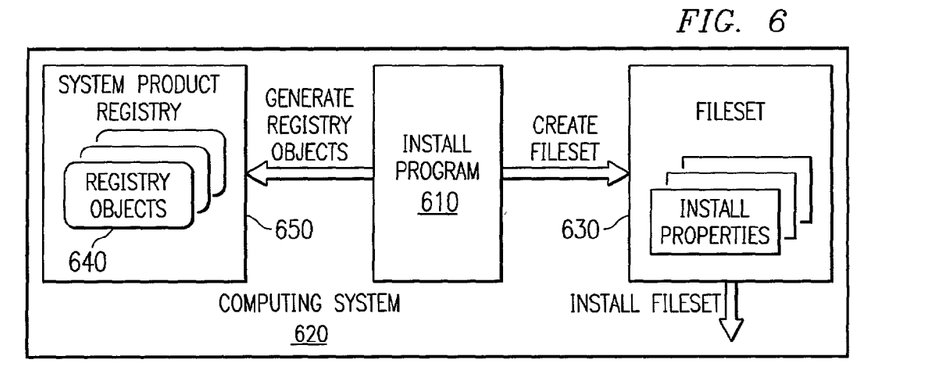
FIG. 6 is a diagram illustrating the reinstantiation of a fileset during an uninstall process.

FIG. 6 is an exemplary block diagram illustrating an alternative embodiment of the present invention. As shown in FIG. 6, in this embodiment of the present invention an installation program 610 is provided that is used to install an application on a computing system 620. During install, a fileset 630 is created to hold the install properties for the application being installed so that these properties may be used by other programs. The install properties are enumerated and registry objects 640 are created in the system product registry 650 for the application install properties.

Once all of the install properties are added to the system product registry 650 as registry objects 640, the fileset 630 is installed. In this way, the install properties for the application are added to the system product registry 650 which is accessible by other programs of the computing system 620.

In this way, when other programs are being installed on the computing system 620, the installation programs may query the system product registry 650 for the install properties in order to better customize the installation of these other programs.

In both embodiments shown in FIGS. 5 and 6, it is sometimes necessary to "filter out" some of the install properties so that they are not stored or made accessible by other programs. For example, properties that may constitute a security risk if made available to other programs may be masked from being stored in the fileset hashtable of system product registry. Such filtering or masking may be based, for example, text strings appearing in the variable names and the like. Other methods of filtering may include having a list of properties to mask, having a property object that has a "mask" method that can be set to deselect the property object from being stored, and the like. Any mechanism for filtering or masking may be used without departing from the spirit and scope of the present invention.

In addition, while FIGS. 5 and 6 are depicted as separate embodiments of the present invention, it should be appreciated that the embodiments shown in FIGS. 5 and 6 may be combined or individual aspects of each of these embodiments may be combined in order to achieve the purposes of the present invention. Moreover, other embodiments in which additional features are added to one or more of the embodiments shown in FIGS. 5 and 6 may be used without departing from the spirit and scope of the present invention.

Figure 7:
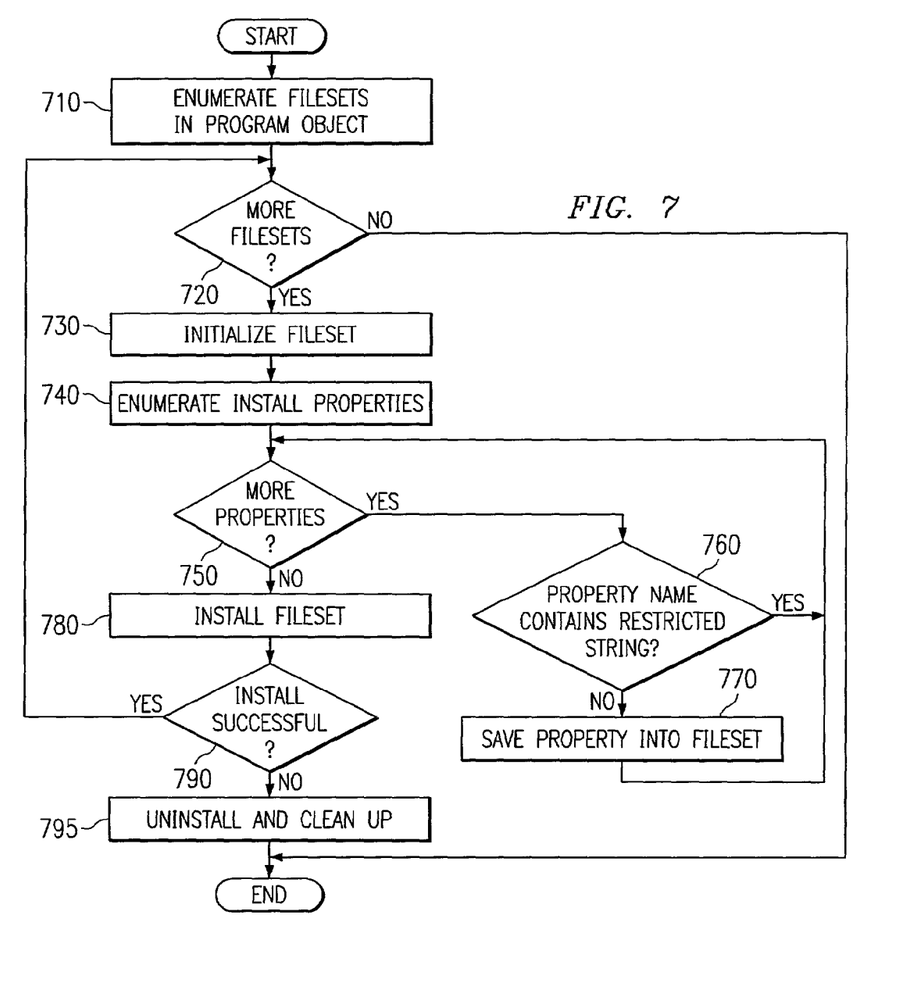
FIG. 7 is a flowchart outlining an exemplary operation of the present invention when storing variables and variable values to a fileset.

FIG. 7 is a flowchart outlining an exemplary operation of the present invention when storing variables and variable values, i.e. installation properties, to a fileset. As shown in FIG. 7, the operation starts with enumerating filesets in the program object (step 710). Then, a determination is made as to whether there is an additional fileset (step 720). If not, the operation ends. Otherwise, the operation continues to step 730.

If there is an additional fileset, the fileset is initialized (step 730). The install properties of the fileset are enumerated (step 740). A determination is made as to whether there is an additional install property for the fileset (step 750). If so, a determination is made as to whether the property name contains a restricted string, e.g. "password" (step 760). If so, the operation returns to step 750 without storing the additional install property. Otherwise, if the property name does not include a restricted string, the additional install property is stored into the fileset (step 770). As previously discussed above, the storing into a fileset may include, for example, storing the install property in a hashtable of the fileset that is part of the serialization of the fileset. The operation then returns to step 750.

If there are no more additional install properties in step 750, the operation installs the fileset (step 780). A determination is then made as to whether the installation of the fileset was successful (step 790). If successful, the operation returns to step 720. If the installation of the fileset was not successful, the fileset is uninstalled and clean up procedures are performed (step 795). The operation then ends.

The following is exemplary code for implementing the flowchart shown in FIG. 7. The following code is for illustration only and is not intended to imply any limitation on the manner by which the present invention may be implemented.

```
/**
* Install the program. This method calls the install of
* each fileset in the program.
*
* @return result of operation OK, CANCEL, or message
*/
public String install ( ){
    String r = "OK"; //result of operation
    ...
    //install all filesets if no errors occurred
    if (r.equals("OK")){
        //Make call to CPP for further processing if necessary
        cpp.install("INIT", this, null);
        for (int i=0; i<fileset.size( ); i++){
            Fileset fs = (Fileset)fileset.elementAt(i);
            //Set uninstall key used for entire program so we
            //know what registry keys to delete when uninstalling
            fs.uninstallName = uninstallName;
            fs.uninstallDesc = uninstallDesc;
            fs.uninstallCommand = uninstallCommand;
            fs.uninstallDir = uninstallDir;
            //Save install properties to every fileset
            for (Enumeration e = installp.keys( ); e hasMoreElements( );){
                String key = (String)e.nextElement( );
                String value = (String)installp.get(key);
                //Do not save any passwords
                String lcKey = key.toLowerCase( );
                If (lcKey.indexOf("password")==-1){
                    fs.temp.put(key, value);
                }
            }
            //Install the fileset
            r = fs.install( );
            //If there was an error, then stop calling filesets and
            //call uninstall on previous filesets, the return error.
            If (!(r.equals("OK"))){
                uninstall(true);
                i = fileset.size( );
            }
        }
    }
    return r;
}
```

Figure 8:
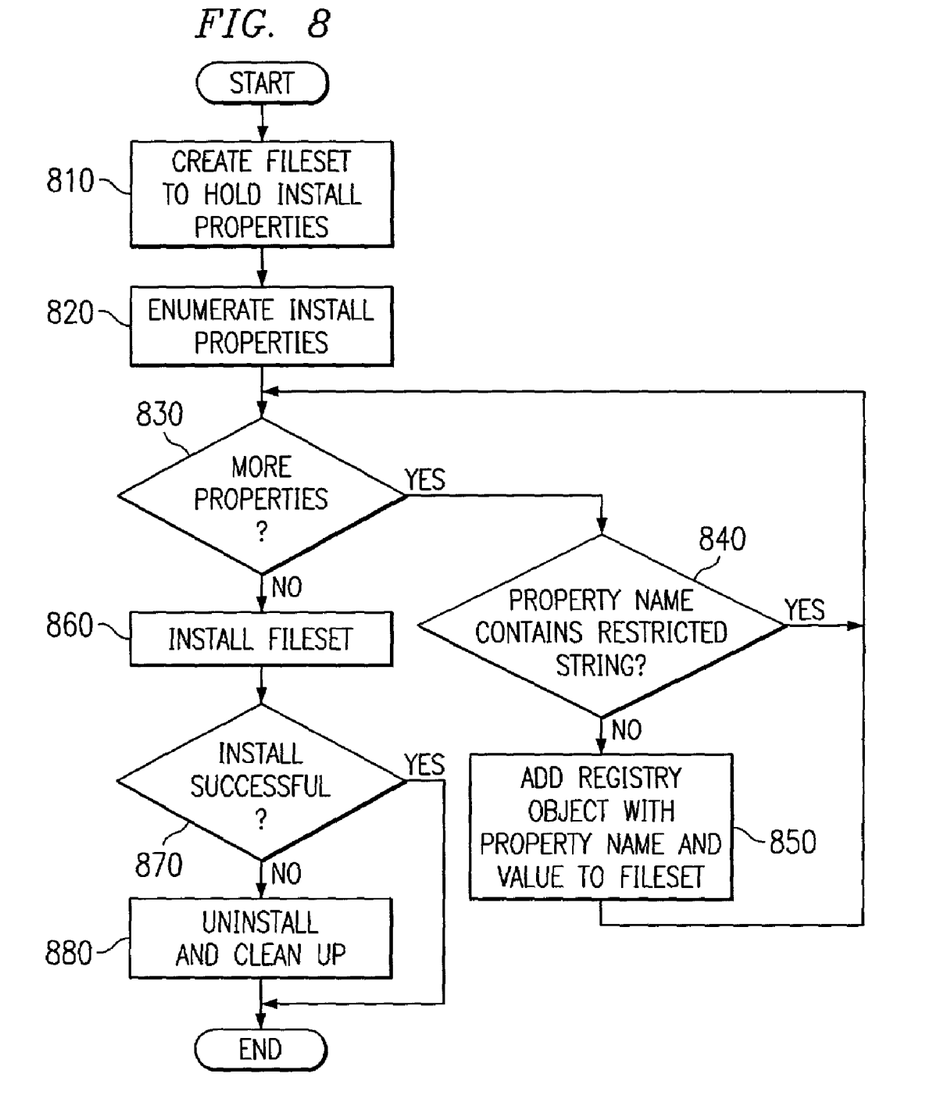
FIG. 8 is a flowchart outlining an exemplary operation of the present invention when storing variables and variable values to a system product registry.

FIG. 8 is a flowchart outlining an exemplary operation of the present invention when storing variables and variable values, i.e. installation properties to a fileset. As shown in FIG. 8, the operation starts by creating a fileset to hold the installation properties (step 810). The install properties are then enumerated (step 820) and a determination is made as to whether there is an additional installation property to be stored in the fileset (step 830). If so, a determination is made as to whether the property name includes a restricted string (step 840). If so, the operation returns to step 830 without storing the property in the system registry. If the property name does not include a restricted string, a registry object is added with the property name and value (step 850). The operation then returns to step 830.

If there are no more additional properties in step 830, the fileset is installed (step 860). A determination is then made as to whether the fileset was installed properly (step 870). If so, the operation ends. Otherwise, if the installation was not properly completed, the fileset is uninstalled and clean up operations are performed (step 880), after which the operation ends.

The following is exemplary code for implementing the flowchart shown in FIG. 8. The following code is for illustration only and is not intended to imply any limitation on the manner by which the present invention may be implemented.

```
/**
 * Install the program. This method calls the install of
 * each fileset in the program.
 *
 * @return result of operation OK, CANCEL, or message
 */
public String Install( ){
    String r = "OK";   //result of operation
    ...
    //Create fileset for adding variables for use by other programs
    Fileset rinfo = addFileset(
            "ITJInfo",
            "ITJ Info",
            "1.0",
            "ITJ Info",
            "," + File.separator,
            backup);
    //Add uninstall information to system product registry
    RegisteryObject displayName = new RegistryObject( );
    displayName.setKeyRoot(Jinstall.HKEY_LOCAL_MACHINE);
DisplayName.setKeyName("Software\Microsoft\Windows\CurrentVersion\Uni
nstall\" + uninstallName = "\\DisplayName");
    displayName.setKeyValue(uninstallDesc);
    rinfo.addObject(displayName);
    RegistryObject uninstallString = new RegistryObject( );
    uninstallString.setKeyRoot(Jinstall.HKEY_LOCAL_MACHINE);
uninstallString.setKeyName("Software\Microsoft\windows\CurrentVersion
\Uninstall\" + uninstallName +"\\UninstallString");
    uninstallString.setKeyValue(uninstallCommand);
    rinfo.addObject(uninstallString);
    RegistryObject logDirString = new RegistryObject( );
    logDirString.setKeyRoot(Jinstall.HKEY_LOCAL_MACHINE);
logDirString.setKeyName("Software\Microsoft\Windows\CurrentVersion\Un
install\" + uninstallName + "\\LogDir");
    logDirString.setKeyValue(logDir);
    rinfo.addObject(logDirString);
    RegistryObject itjString = new RegistryObject( );
    itjString.setKeyRoot(Jinstall.HKEY_LOCAL_MACHINE);
itjString.setKeyName("Software\Microsoft\Windows\CurrentVerison\Unins
tall\" + uninstallName + "\\ITJ");
    itjString.setKeyValue("T");
    rinfo.addObject(itjString);
    //Add all install variables to system product registry
    InstallProperties installp = install.getProperties( );
    for (Enumeration e = installp.keys( ); e hasMoreElements( );){
        String key = (String)e.nextElement( );
        String value = (String)installp.get(key);
        //Do not save any passwords
        String lcKey = key.toLowerCase( );
        if (lcKey.indexOf("password")==-1){
            registryObject props = new RegistryObject( );
            props.setKeyRoot(Jinstall.HKEY_LOCAL_MACHINE);
            props.setKeyName("Software\IBM\ITJ\\" +
uninstallName + "\\" + logDir + "\\" +key);
            props.setKeyValue(value);
            rinfo.addObject(props);
        }
    }
    //Install all filesets if no errors occurred
    if (r.equals("OK")){
    ...
    }
    return r;
}
```

As described above, the present invention provides a mechanism through which all of the all of the installation properties may be stored for later use by an uninstall program or other applications. In this way, the uninstall program may obtain all of the necessary information to recreate the state of the filesets at installation of the program and other applications may obtain information regarding the settings and variable values used during installation of another program in order to better customize their own installation.

Thus, the present invention provides a mechanism that allows developers of installation programs and uninstall programs to have flexibility in customizing these programs, due to the availability of all installation properties. That is, developers of installation programs and uninstall programs are not restricted by the particular properties deemed significant by the developer of the original installation program for an installed application.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of installing a program in a computing device, comprising:

initiating installation of a program on the computing device;

for each installation property used during installation of the program, storing the installation property in a fileset, wherein storing the installation property in the fileset further includes determining if the installation property is to be masked, and not storing the installation property in the fileset if the installation property is to be masked; and installing the fileset.

2. The method of claim 1, further comprising:

generating a registry object for each installation property; and storing the registry object in a system product registry for the program.

3. The method of claim 1, wherein storing the installation property in a fileset includes storing the installation property in a hashtable of the fileset.

4. The method of claim 3, further comprising:

serializing the fileset including the hashtable; and storing the serialized fileset on a storage medium.

5. The method of claim 1, wherein the installation properties include user defined or installation program generated variables that are used during installation but do not directly represent items that need to be uninstalled.

6. The method of claim 5, wherein the installation properties include at least one of user selections from menus and typed-in information supplied by the user.

7. The method of claim 4, wherein upon initiation of an uninstall program, the serialized fileset is reinstantiated and the uninstall program accesses the installation properties from the hashtable to recreate an installation state.

8. The method of claim 4, further comprising:

initiating an uninstall application for uninstalling the program;

reinstantiating the serialized fileset; and customizing operation of the uninstall application based on the installation property in the hashtable of the serialized fileset.

9. The meted of claim 1, wherein determining if the installation proprty is to be masked includes at least one of determining if a property name includes a predetermined string, determining if the property name is part of a list of masked property names, and providing a mask method for the installation property.

10. A method of installing a program in a computing device such that other programs will have access to installation properties, comprising:

initiating installation of a program on the computing device;

for each installation property used during installation of the program, storing the installation property in a fileset, wherein storing the installation property in the fileset further includes determining if the installation property is to be masked, and not storing the installation property in the fileset if the installation property is to be masked;

generating a registry object for each installation property; and storing the registry object in a system product registry for the program, wherein other programs access the installation properties via the registry object in the system product registry.

11. The method of claim 10, wherein the other programs include an uninstall program, and wherein the uninstall program generates a fileset and initializes parameters of the fileset based upon the installation properties in the registry object.

12. A computer program product in a computer readable medium for installing a program in a computing device, comprising:

first instructions for initiating installation of a program on the computing device;

second instructions for storing for each installation property used during installation of the program, the installation property in a fileset, wherein the second instructions for storing the installation property in the fileset further include instructions for determining if the installation property is to be masked, and instructions for not storing the installation property in the fileset if the installation property is to be masked; and third instructions for installing the fileset.

13. The computer program product of claim 12, further comprising:

fourth instructions for generating a registry object for each installation property; and fifth instructions for storing the registry object in a system product registry for the program.

14. The computer program product of claim 12, wherein the second instructions for storing the installation property in a fileset include instructions for storing the installation property in a hashtable of the file set.

15. The computer program product of claim 14, further comprising:

fourth installations for serializing the fileset including the hashtable; and fifth instructions for storing the serialized fileset on a storage medium.

16. The computer program product of claim 12, wherein the installation properties include user defined or installation program generated variables that are used during Installation but do not directly represent items that need to be uninstalled.

17. The computer program product of claim 16, wherein the installation properties include at least one at user selections from menus and typed-in information supplied by the user.

18. The computer program product of claim 15, wherein upon initiation of an uninstall program, the serialized fileset is reinstantiated and the uninstall program accesses the installation properties from the hashtable to recreate an installation state.

19. The computer program product of claim 15, further comprising;
   sixth instructions for initiating an uninstall application for uninstalling the program;
   seventh instructions for reinstantiating the serialized fileset; and
   eighth instructions for customizing operation of the uninstall application based on the installation property in the hashtable of the serialized fileset.

20. The computer program product of claim 12 wherein the instructions for determining if the installation property is to be masked include at least one of instructions for determining if a property name includes a predetermined string, instructions for determining if the property name is part of a list of masked property names, and instructions for providing a mask method for the installation property.

21. A computer program product in a computer readable medium for installing a program in a computing device such that other programs will have access to installation properties, comprising:
   first instructions for initiating installation of a program on the computing device;
   second instructions for storing, for each installation property used during installation of the program, the installation property in a fileset, wherein the second instructions for storing the installation property in the fileset further include instructions for determining if the installation property is to be masked, and instructions for not storing the installation property in the fileset if the installation property is to be masked;
   third instructions for generating a registry object for each installation property; and
   fourth instructions for storing the registry object in a system product registry for the program, wherein other programs access the installation properties via the registry object in the system product registry.

22. The computer program product of claim 21, wherein the other programs include an uninstall program, and wherein the uninstall program generates a fileset and initializes parameters of the fileset based upon the installation properties in the registry object.

23. An apparatus for installing a program in a computing device, comprising:
   means for initiating installation of a program on to computing device;
   means for storing, for each installation property used during installation of the program, the installation property in a fileset, wherein means for storing the installation property in the fileset further includes means for determining if the installation property is to be masked, and means for not storing the installation property in the fileset if the installation property is to be masked; and
   installing the fileset.

24. An apparatus for installing a program in a computing device such that other programs will have access to installation properties, comprising:
   means for initiating installation of a program on the computing device;
   means for storing, for each installation property used during installation of the program, the installation property in a fileset, wherein means for storing the installation property in the fileset further includes means for determining if the installation property is to be masked, and means for not storing the installation property in the fileset if the installation property is to be masked;
   means for generating a registry object for each installation property; and
   means for storing the registry object in a system product registry for the program, wherein other programs access the installation properties via the registry object in the system product registry.

* * * * *